US008282869B2

(12) United States Patent
Anderson et al.

(10) Patent No.: US 8,282,869 B2

(45) Date of Patent: Oct. 9, 2012

(54) METHOD FOR MAKING PRECAST CONCRETE METER PIT

(75) Inventors: Edward J. Anderson, Bow Mar, CO (US); Geoffery S. Parrington, Thornton, CO (US); Eugene J. Pelchat, Jr., Sgt. Bluff, IA (US)

(73) Assignee: Precast Concepts, LLC, Henderson, CO (US)

( * ) Notice: Subject to any disclaimer, the term of this patent is extended or adjusted under 35 U.S.C. 154(b) by 1027 days.

(21) Appl. No.: 12/288,172

(22) Filed: Oct. 17, 2008

(65) Prior Publication Data

US 2009/0084793 A1 Apr. 2, 2009

Related U.S. Application Data

(63) Continuation-in-part of application No. 11/048,544, filed on Jan. 31, 2005, now abandoned.

(51) Int. Cl.

| | |
|---|---|
| ***B28B 21/22*** | (2006.01) |
| ***B28B 21/24*** | (2006.01) |
| *B28B 21/34* | (2006.01) |
| *F16L 9/08* | (2006.01) |

(52) U.S. Cl. ....................... 264/312; 264/333; 264/297.9

(58) Field of Classification Search ............... 264/297.9, 264/312, 333; 425/267, 427

See application file for complete search history.

(56) References Cited

U.S. PATENT DOCUMENTS

| | | | | |
|---|---|---|---|---|
| 2,751,657 | A | 6/1956 | Holston | |
| 3,616,500 | A * | 11/1971 | Peck et al. | 264/310 |
| 3,632,270 | A | 1/1972 | Baker et al. | |
| 3,724,506 | A | 4/1973 | Crowe | |
| 3,922,133 | A | 11/1975 | Crawford et al. | |
| 4,118,165 | A | 10/1978 | Christian | |
| 4,248,580 | A | 2/1981 | Christian | |
| 4,253,814 | A | 3/1981 | Christian | |
| 4,540,539 | A | 9/1985 | Crawford et al. | |
| 4,690,631 | A | 9/1987 | Haddy | |
| 5,080,571 | A | 1/1992 | Crawford | |
| 5,248,248 | A | 9/1993 | Adly | |
| 5,364,578 | A | 11/1994 | Grau | |
| 5,456,590 | A | 10/1995 | Volmari | |
| 5,616,351 | A | 4/1997 | Wensauer | |
| 5,648,108 | A | 7/1997 | Hvidegaard | |

* cited by examiner

*Primary Examiner* — Christina Johnson
*Assistant Examiner* — Patrick Butler
(74) *Attorney, Agent, or Firm* — The Reilly Intellectual Property Law Firm, P.C.; Ellen Reilly; John E. Reilly

(57) ABSTRACT

A precast concrete meter pit consisting of a plurality of precast concrete hollow elongated cylindrical wall sections in end to end relation to one another is fabricated by utilizing a slip form packerhead apparatus in which the wall sections are formed with an annular slip ring when concrete is injected into the slip form apparatus.

12 Claims, 10 Drawing Sheets

METHOD FOR MAKING PRECAST CONCRETE METER PIT

CROSS-REFERENCE TO RELATED APPLICATIONS

This application is a Continuation-In-Part of U.S. Ser. No. 11/048,544, filed 31 Jan. 2005, entitled "PRECAST CONCRETE METER PIT AND METHOD AND APPARATUS FOR MAKING SAME," which application is incorporated by reference herein.

BACKGROUND AND FIELD

This apparatus relates to meter pits; and more particularly relates to a novel and improved precast concrete meter pit and to a method and apparatus for manufacturing same.

Meter pits for water meters are customarily fabricated out of plastic or multiple stacked concrete sections in the form of a cylindrical pipe. The plastic meter pits typically sell at a higher price than concrete pits and tend to deform under certain conditions. The concrete-sectioned meter pits are assembled in segments using a tongue-and-groove connection which is labor intensive and also poses a safety risk when assembling the meter pits by hand which must be transported and assembled on site. The pipes are then buried in the ground, typically below frost level, and have an upper end which is adapted to receive a cover in order to withstand extremely cold temperatures and particularly to insulate the water meter from cold temperatures. However, there is a need for a meter pit having a plurality of precast sections fabricated in a one-step slip form operation and which will allow for easy placement and removal of the meter pit sections.

In addition, packerhead assemblies have been devised for slip forming concrete pipe including a trowel assembly at one end of the packerhead assembly to form an outwardly directed, offset end but for several reasons are not practical for use as a meter pit. A representative patent is U.S. Pat. No. 5,080,571 to Crawford incorporated by reference herein in which a trowel assembly is employed in association with the packerhead assembly to specially shape one end of the concrete pipe; however, as will become hereinafter more apparent, the concrete pipe as manufactured in accordance with that patent is not conformable for use as a meter pit. Accordingly, there is also a need for a novel and improved method and apparatus for fabricating meter pits with a removable slip ring.

SUMMARY

It is therefore desirable to provide for a novel and improved meter pit which can be fabricated out of concrete in a one-step slip forming operation in a simple and efficient manner. Accordingly, a meter pit is comprised of elongated precast wall sections of generally cylindrical configuration in end to end relation to one another and wherein the pit is made from the steps of securing a slip ring within a concentric jacket, positioning a pallet with the concentric jacket attached thereto on a turntable, lowering a packerhead assembly within the jacket, the packerhead having a concentric rollerhead provided with a trowel, the trowel having a radially inwardly and downwardly inclined lower edge, injecting concrete into an annular space between the jacket and the rollerhead for downward flow until the space is entirely filled, raising the rollerhead and trowel as the annular space is being filled followed by removing the jacket, and removing the slip ring from the wall sections.

The apparatus for making a precast concrete meter pipe wherein a packerhead assembly includes a trowel assembly and a rollerhead assembly, a jacket in outer spaced concentric relation to the packerhead assembly, a slip ring positioned within the jacket and means for rotating the rollerhead assembly, the improvement comprising the trowel assembly being of generally cylindrical configuration and terminating in a radially inwardly and downwardly inclined lower edge, and an annular pallet positioned beneath the trowel assembly having a riser circumscribing an inner annular edge thereof and extending upwardly within the trowel assembly.

In practice, the pallet is vibrated as the concrete is advanced by gravity flow through the space between the jacket and packerhead assembly to rapidly fill and pack the entire space beginning with the enlarged area between the lower end of the trowel and jacket.

The above and other objects, advantages and features will become more readily appreciated and understood from a consideration of the following detailed description together with the accompanying drawings in which:

DETAILED DESCRIPTION

Figure 1:
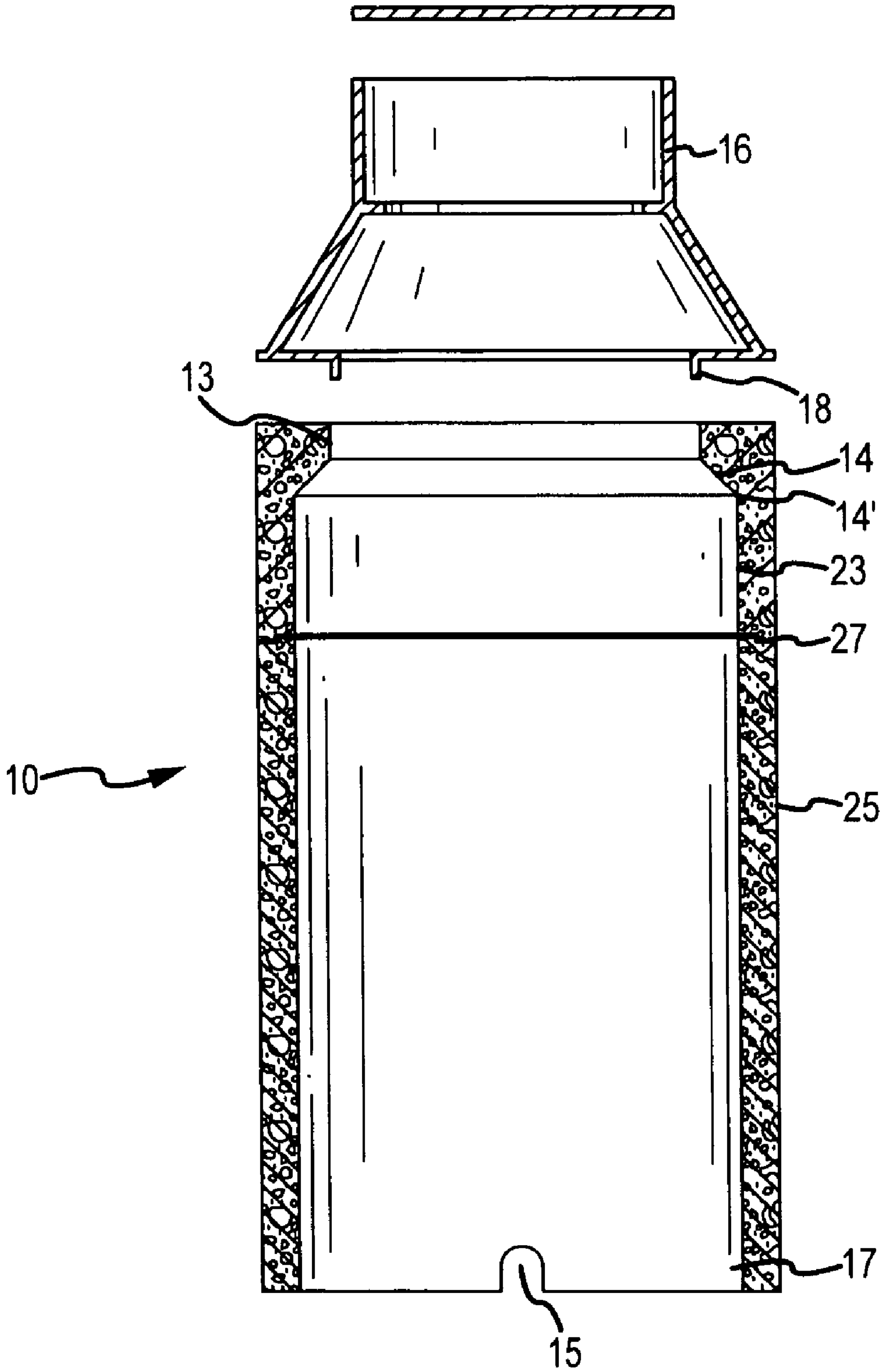
FIG. 1 is a sectional view of a form of meter pit and cover.
Figure 2:
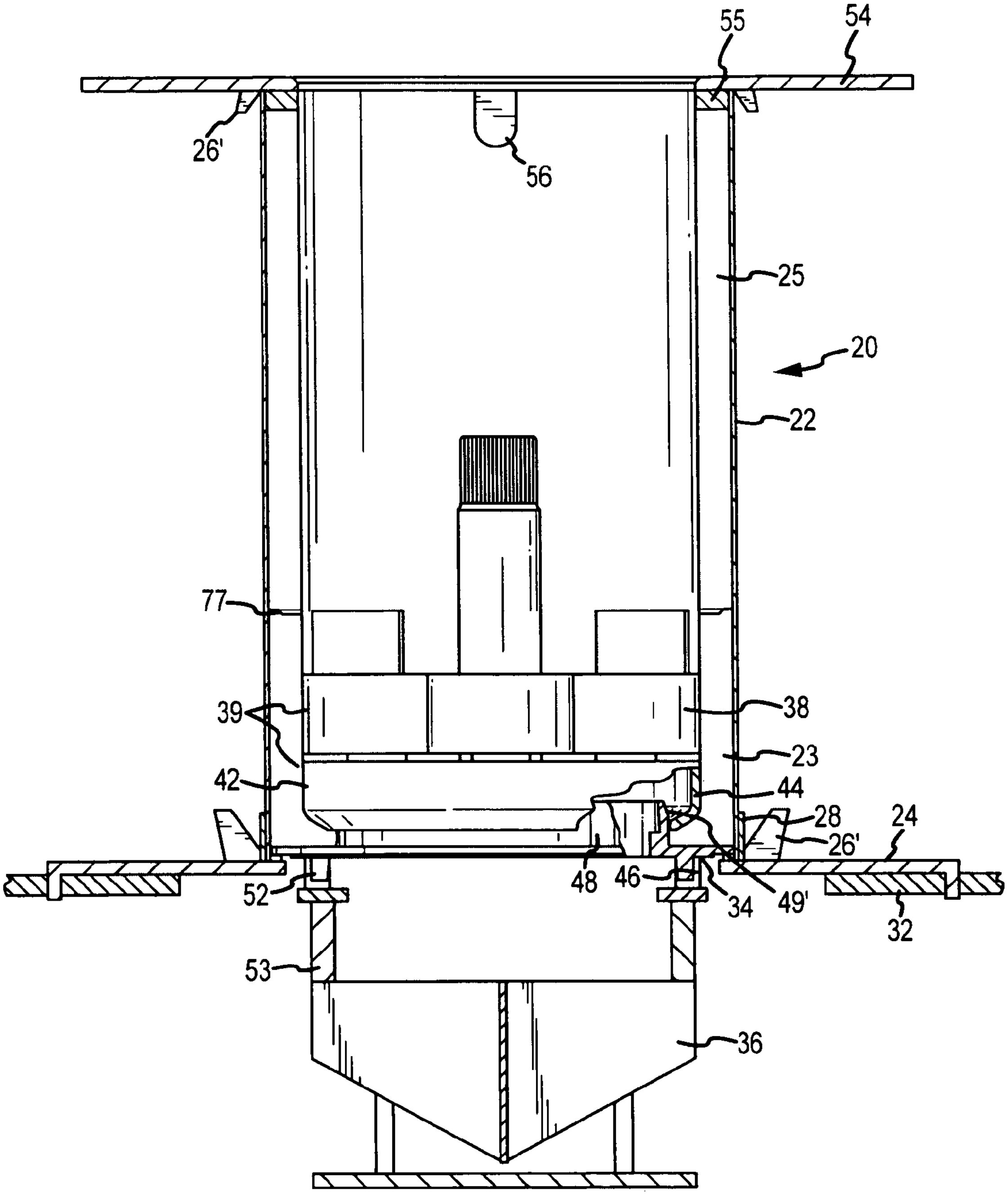
FIG. 2 is a view partially in section of a packerhead assembly employed in the fabrication of meter pits.
Figure 3A:
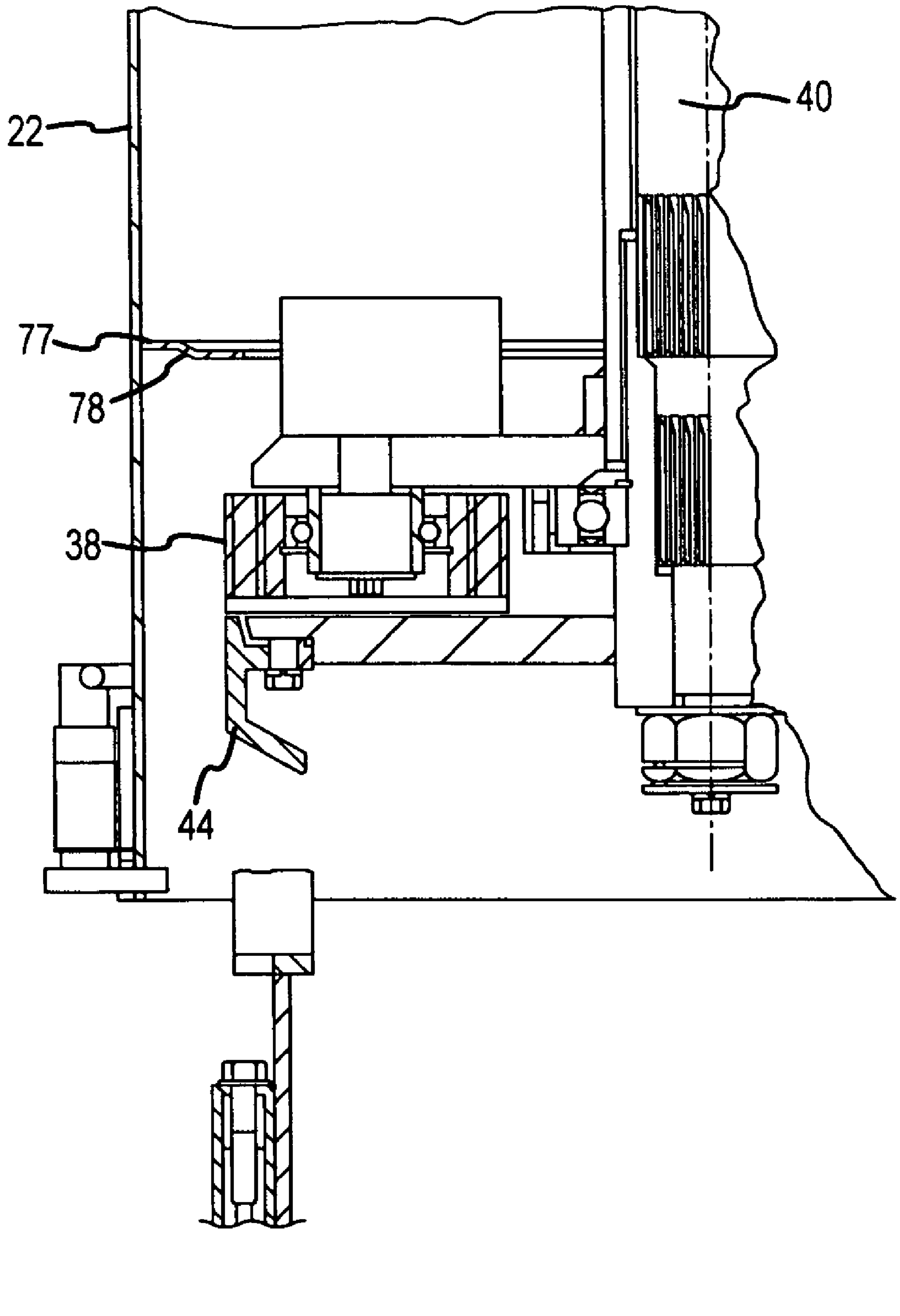
FIG. 3A is view partially in section of a an outer jacket and a pallet forming a part of the packerhead assembly of FIG. 2.
Figure 3B:
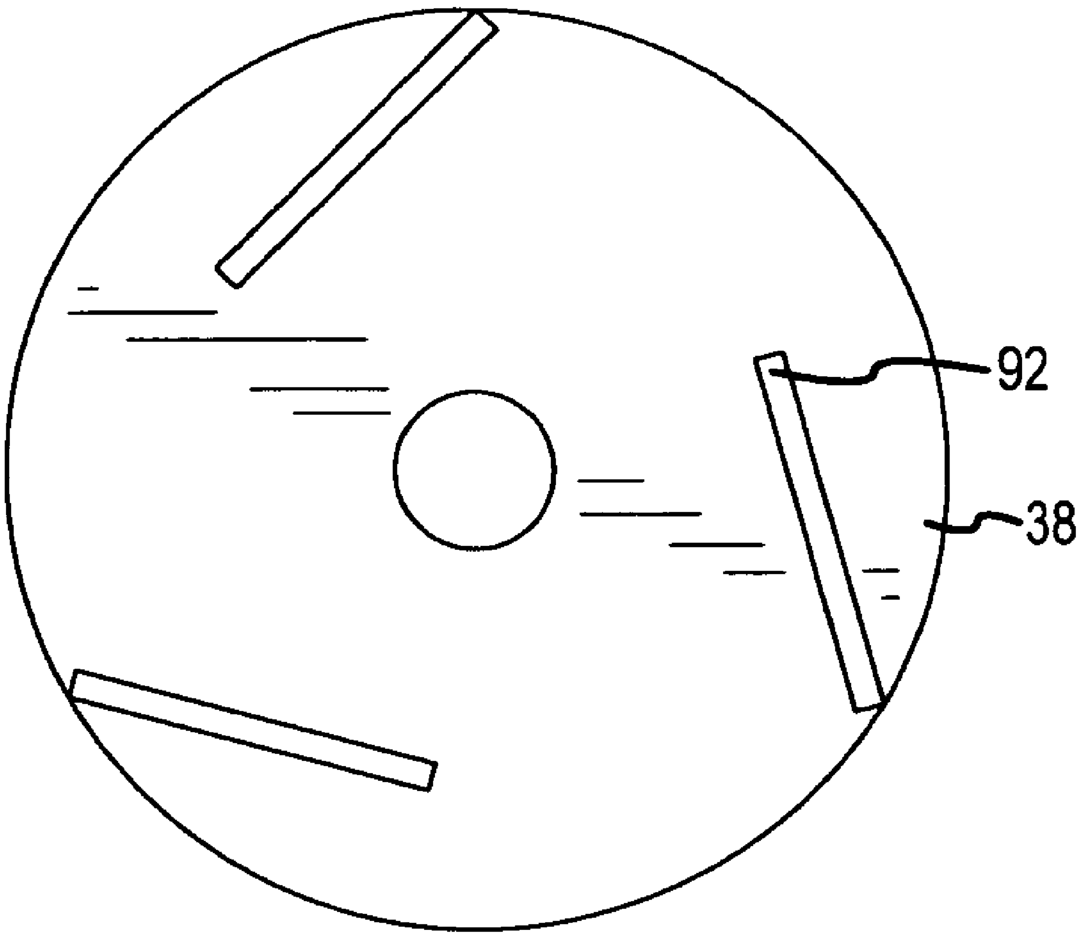
FIG. 3B is a top plan view of a rollerhead forming a part of the packerhead assembly of FIG. 2.
Figure 3C:
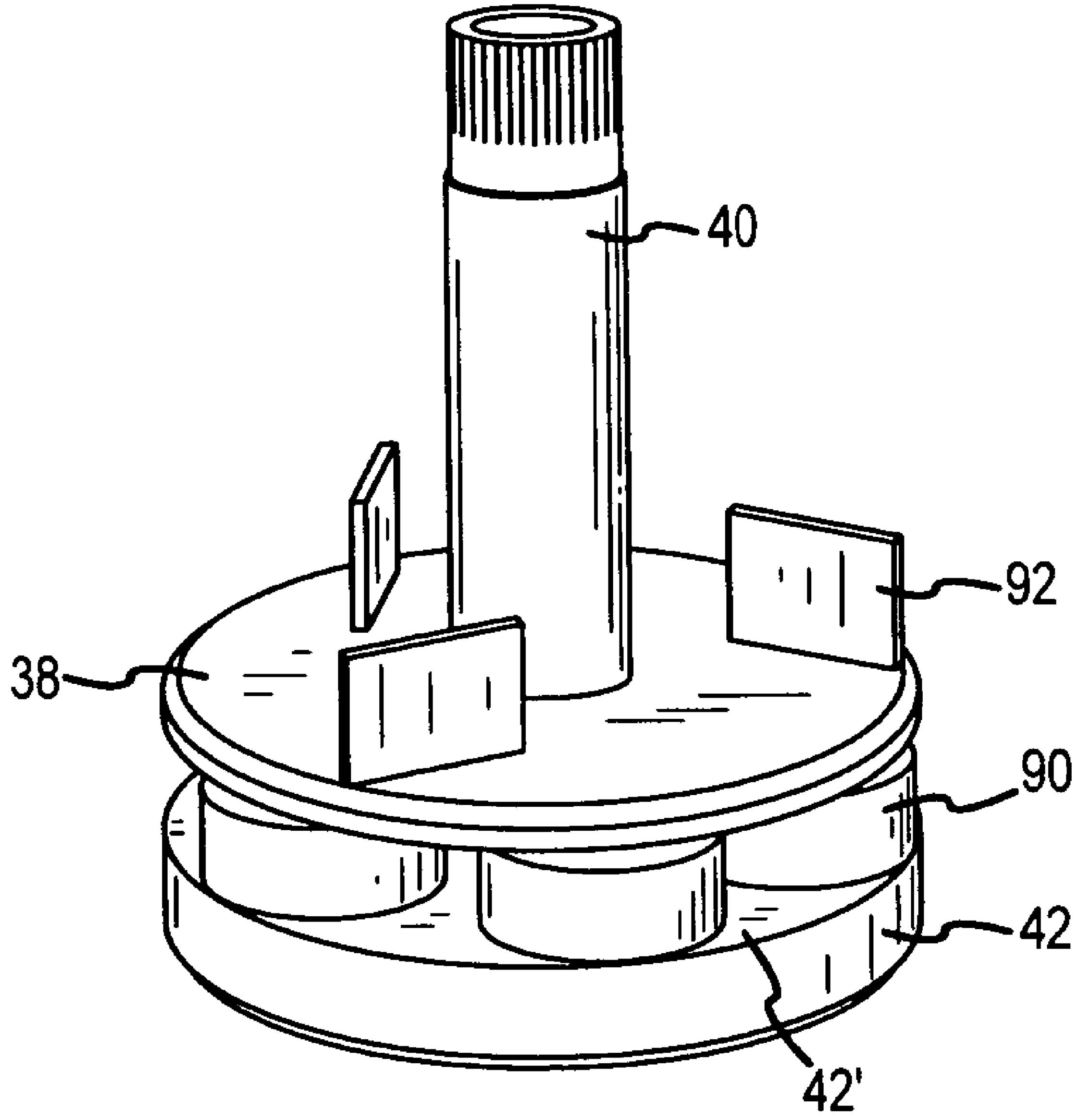
FIG. 3C is a perspective view of a packerhead assembly.
Figure 8A:
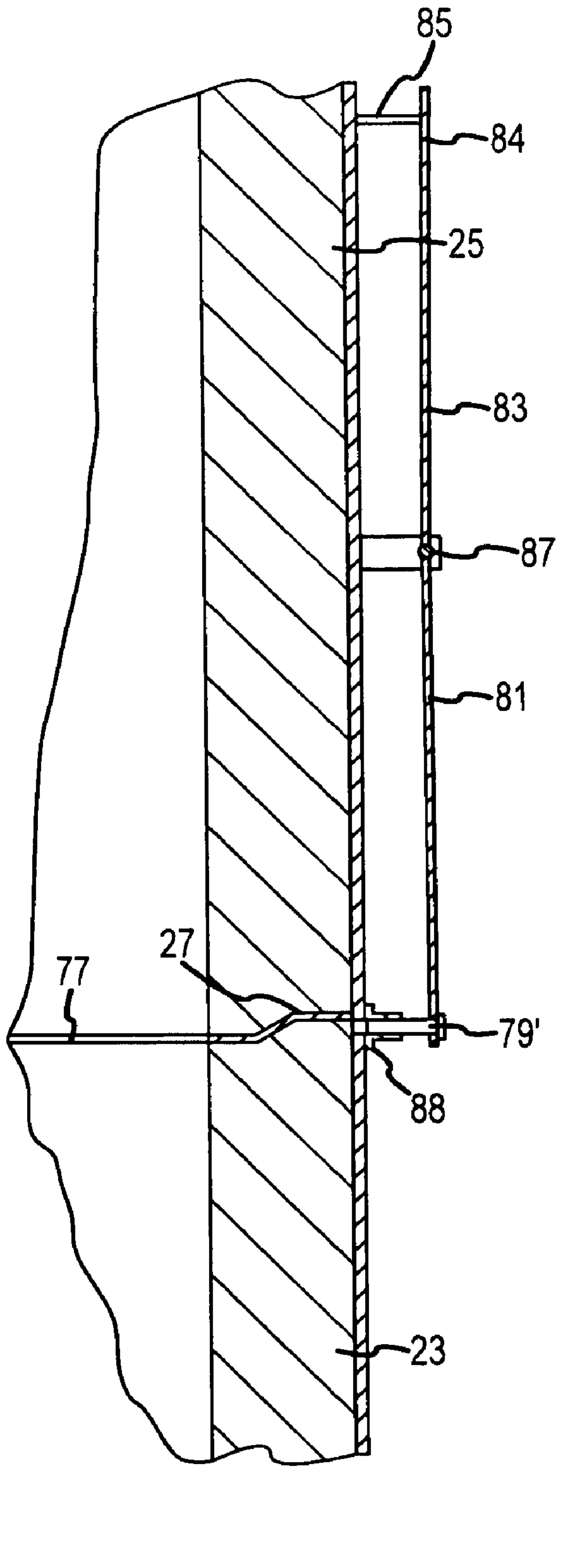
FIG. 8A is a cut away view, partially in section of the slip ring and jacket of FIG. 1.

There is illustrated in FIG. 1 a form of meter pit 10 for housing a water meter, not shown, beneath the ground. The meter pit 10 is comprised of a plurality of hollow precast concrete wall sections 23 and 25 of cylindrical configuration and which are of uniform thickness throughout except for an upper end of the first section 23 terminating in a beveled edge 13 which defines a support ledge projecting radially inwardly from an upper terminal end 14. The first section 23 and the second section 25 have a lap joint 27 between adjoining ends of the two sections for a stepped fitting, as shown in FIG. 8A, allowing for easy placement and removal of the first section 23 from the second section 25. Due to the fact that the water meter (not shown) is housed within the meter pit 10 for use in the field, maintenance or access to the water meter is often necessary and made possible by removal of the first section 23 from the second section 25.

Dual spaced notches 15 are formed in an opposite lower edge 17 for receiving water lines, not shown. Although a single notch is illustrated, there is a diametrically opposed notch and which together receive the water lines for water flow into and out of the water meter. The terminal end 14 of the beveled edge 13 is substantially flat and squared to the longitudinal axis of the pipe so as to form a ledge or seat for supporting a generally bell-shaped cover 16. The cover 16 is of standard construction including spaced projections or posts 18 which fit inside the ledge 13 and help to position and situate the cover 16 on the support ledge 13. The cover 16 is commonly referred to as a double lid cover which provides a dead air space between the top lid and the interior of the pit 10. The dead air space acts as an insulator, retaining pit heat and keeping outside cold air from entering. The meter pit as described is equally conformable for use with single lid covers and flat covers which may be utilized in milder climates. Grade rings (not shown) may also be inserted between the cover 16 and the support ledge 13 to adjust the height of the cover 16 to match the surface grade.

Figure 4:
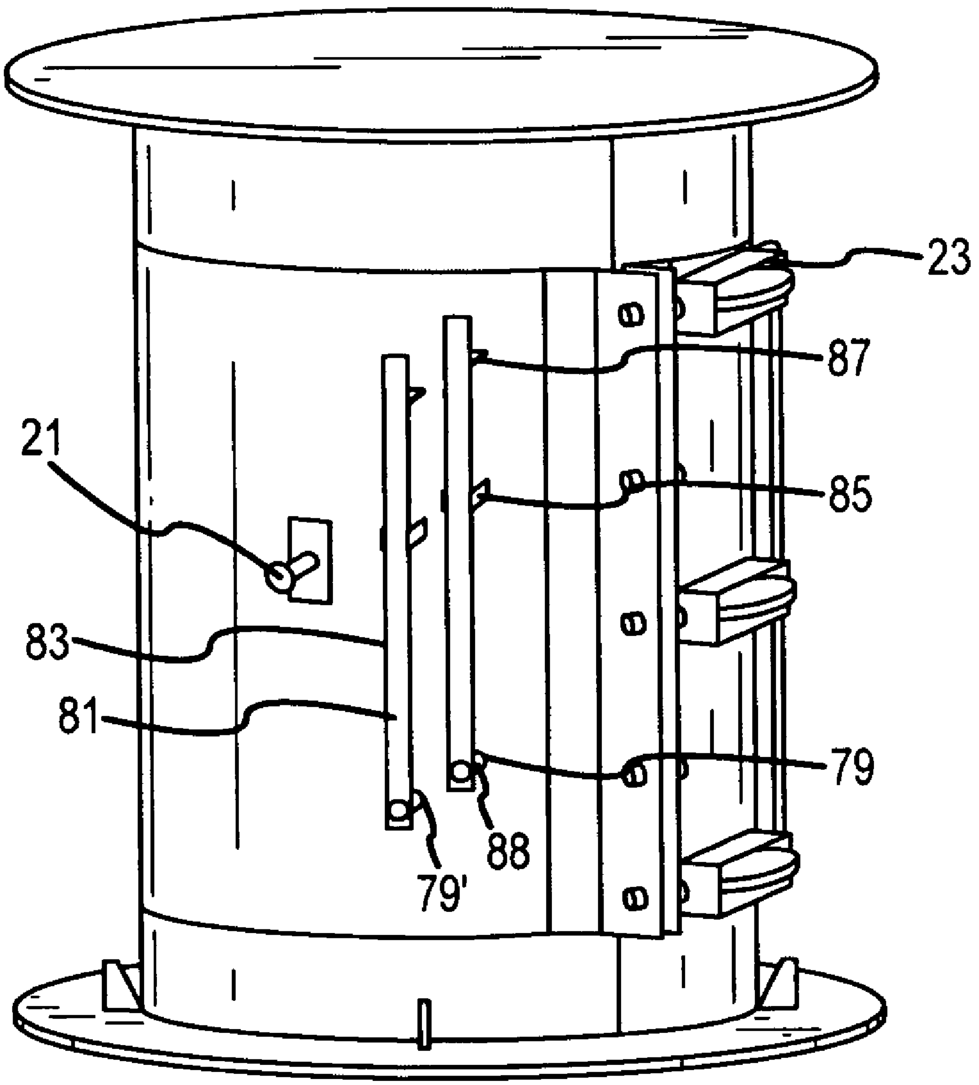
FIG. 4 is a perspective view of an outer jacket forming a part of the packerhead assembly of FIG. 2.
Figure 5:
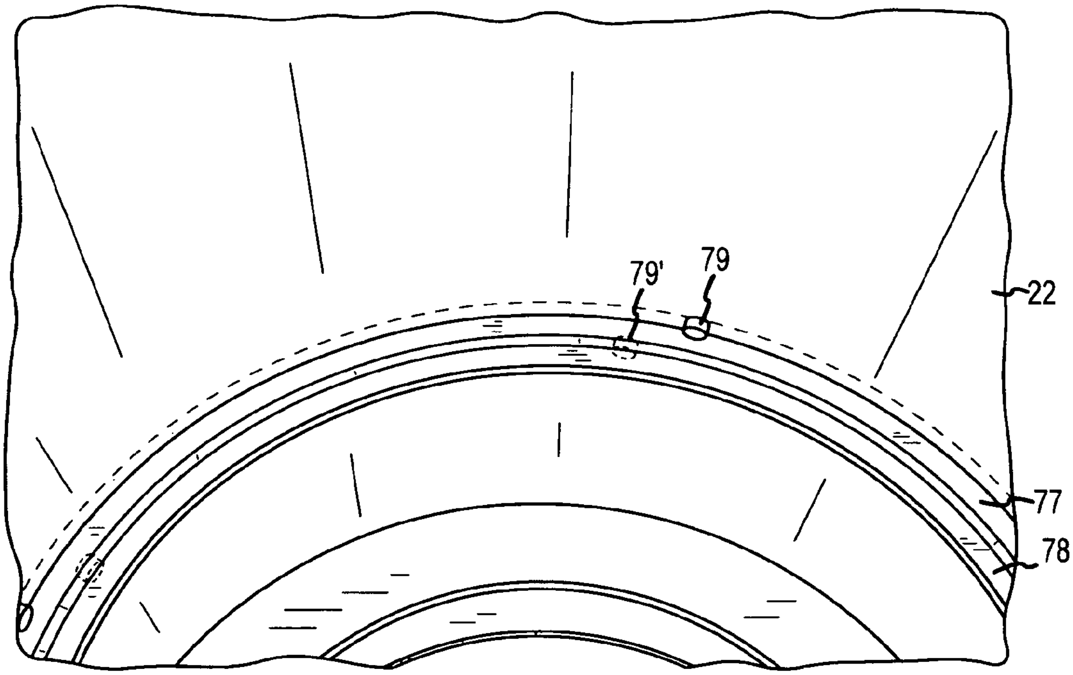
FIG. 5 is a sectional view of an interior of the outer jacket of FIG. 4.
Figure 6:
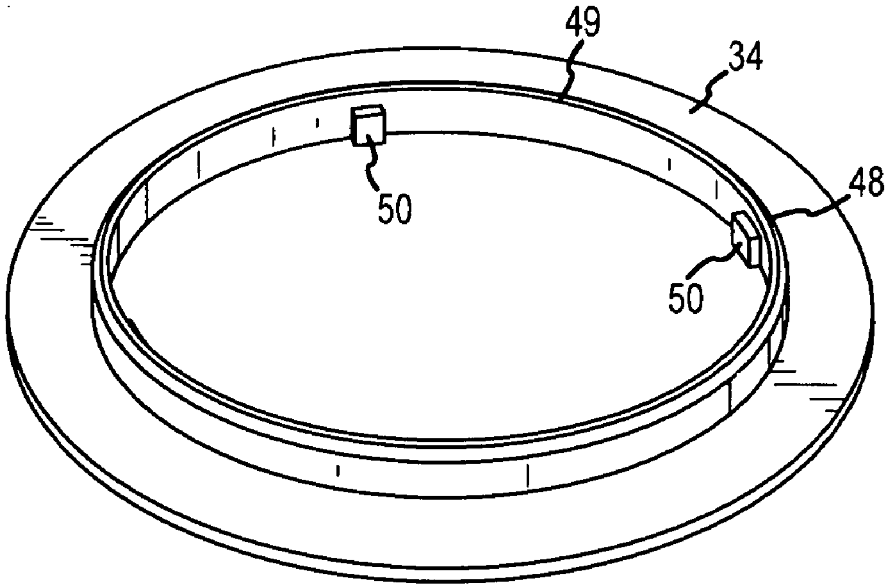
FIG. 6 is a perspective view of a pallet forming a part of the packerhead assembly of FIG. 2.
Figure 7:
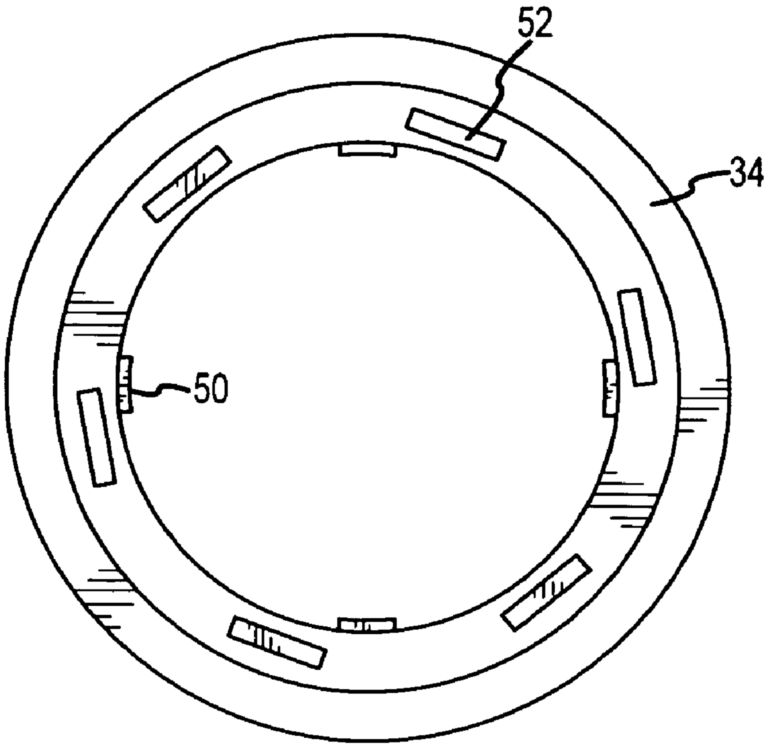
FIG. 7 is a bottom view of the pallet shown in FIG. 6.
Figure 8B:
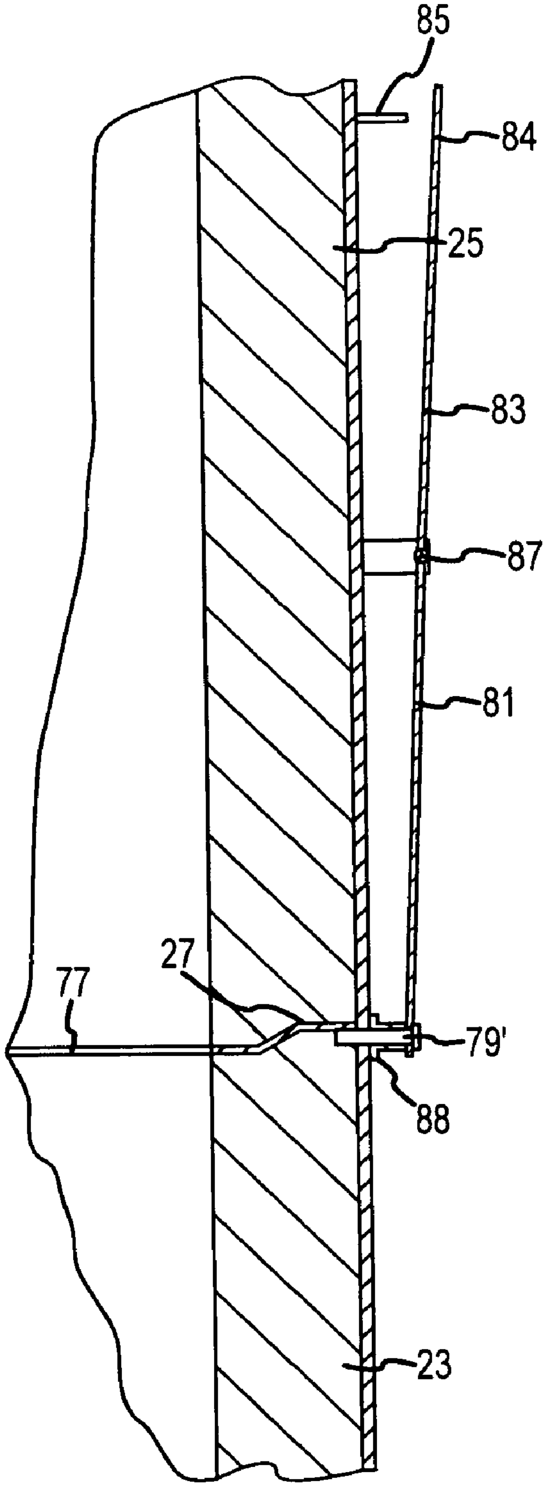
FIG. 8B is a cut away view, partially in section of the slip ring and jacket of FIG. 1.

One form of apparatus 20 for manufacturing meter pits 10 is illustrated in FIGS. 2 to 8B and is broadly comprised of a jacket or form 22 mounted on a pallet 34. The jacket 22 incorporates a slip ring 77, of annular configuration positioned within the jacket to create the first and second meter pit sections 23 and 25. The slip ring 77 is preferably formed of metal and has a stepped or ridged surface 78 creating the lap joint 27 between the first and second sections 23 and 25. The slip ring 77 has an outer radius equivalent to the width of the meter pit to allow passage of a packerhead assembly which will be described in more detail. The jacket 22 has circumferentially spaced bores 88 that are aligned with radially inwardly projecting upper and lower pin members 79, 79' which retain the slip ring 77 in position. The upper pin members 79 are connected to one of several pairs of circumferentially spaced levers 81 and are positioned circumferentially above the desired location of the slip ring 77 in spaced relation to one another. The lower pin members 79' are similarly connected to the spaced levers 81, but are positioned circumferentially below the desired location of the slip ring 77. The pin members 79, 79' are adapted to be retracted from the aligned bores 88 with the aid of the spaced levers 81. The lever pairs 81 each include a longitudinally extending bar 83, bar stop member 85 and a lever fulcrum 87 as well as one of the pin members 79, 79' that protrude through the bores 88 of the jacket 22. The lever pairs 81 are slightly offset vertically from one another to accommodate the upper and lower positioning of the pin members 79, 79'. The bar 83 may be positioned so that the pin member 79 or 79' engages the slip ring 77 causing the slip ring 77 to remain in a desired position, as shown in FIG. 8B, or the bar 83 may also be positioned so that a top portion 84 of the bar 83 engages or is in touching relation to the stop member 85, as shown in FIG. 8A, thereby causing withdrawal or retraction of the pin members from the bores 88, allowing for separation of the jacket 22 from the slip ring 77. The slip ring 77 may be conveniently hung on handle member 21 as shown in FIG. 4.

In use, the pallet 34 and the jacket 22 are mounted with a forklift onto a bottom centering plate 24 having upright centering blades 26 at uniformly spaced circumferential intervals along with shims 28 around the outside of the jacket 22. The jacket 22 has the slip ring 77 positioned therein with the levers 81 causing the pin members 79, 79' to engage with the slip ring 77. The centering plate 24 has been previously mounted on a turntable 32. The meter pit pallet 34 which is of special design allowing a trowel 44 to extend along an outer circumference of the pallet 34 is aligned for contact with a vibrator unit 36. The vibrator unit used is manufactured by Besser International Pipe Machinery of Sioux City, Iowa, Part No. 2100917 having a vibrational maximum of 3,600 rpm and an impact maximum of 10,000 lbs. An 18" turning and vibrating standard or TV stand 53 also manufactured by Besser International Pipe Machinery, Part No. 0801433 is mounted above the vibrator unit 36. The pallet 34 rests on the TV stand allowing for both rotation and vibration of the pallet 34. A packerhead assembly 39 includes a rollerhead assembly 38 which is of special design and is mounted for rotation on a packer shaft 40 and a longbottom assembly 42 which is comprised of a mounting flange (not shown) and the trowel or trowel assembly 44. The jacket 22 is in outer spaced concentric relation to the rollerhead and trowel assemblies. The rollerhead assembly 38 is also of special design comprising a plurality of rollerheads defined by a plurality of rollers 90 mounted to plate 42' which is connected to the longbottom assembly 42. Each roller 90 has a fin or paddle member 92 mounted thereon. However, the longbottom assembly 42 which is positioned directly beneath the rollerhead assembly and joined for rotation therewith includes the trowel 44 which inclines somewhat diagonally and inwardly in a downward direction with a lower edge 46 bearing lightly against a riser portion 48 of the pallet 34. The pallet 34 is annular and positioned beneath the trowel assembly 44, an inner annular edge 49 of the riser 48 extending upwardly within the trowel assembly 44. The pallet 34 is also provided with radially inwardly projecting teeth 50 at spaced intervals around the inner surface of the riser 48, and downwardly projecting flanges 52 which serve to aid in rotation and vibration of the pallet and also serve to act as stabilizers when the pallet 34 is placed on an uneven surface. A top centering plate or cover plate 54 is bolted to a top table 55 and is positioned on the jacket 22 with centering blades 26' and has downwardly projecting lobes 56 at spaced circumferential intervals to form the notches 15 for insertion of the water lines as described.

In the standard pipe making process as employed in the hereinbefore referred to U.S. Pat. No. 5,080,571, concrete is injected into the space between the jacket and rollerhead wherein the longbottom assembly and rollerhead assembly are rotated in opposite directions as they are advanced upwardly, past the slip ring 77, so as to compact the concrete with centrifugal force and packing pressure from the rollerheads in accordance with standard pipe making procedures. Also, when used in association with the pallet in pipe making processes, the pallet is caused to spin and to vibrate. In the present apparatus, however, the pallet typically only vibrates but is capable of spinning.

Accordingly, the meter pit 10 is fabricated upside down by the apparatus 20. Specifically, the pallet 34 permits the longbottom assembly and more specifically the trowel 44 to extend around the outer circumference of the pallet in forming the support ledge 13 with an inner beveled surface portion 14'. For this purpose, the pallet 34 has the beveled edge 49 on the riser 48 to assist in centering and sliding the trowel assembly around the outer edge of the pallet. However, the pallet does not spin as typically required for pipe making but instead is journaled with respect to the table and caused to vibrate in a manner to be described. It is important to note that while the manufactured meter pit of this apparatus does not typically require rotation of the pallet 34, further compaction of the cement may be achieved with rotation as well as vibration of the pallet 34.

Summarizing the steps followed in the meter pit fabrication procedure:

1. Set up machine 10 for meter pit manufacture which consists of mounting the centering plates 24 to the turntable 32 and mounting the TV stand 53 onto the vibrator unit 36.

2. Positioning the slip ring 77 within the jacket 22 using the positioning lever 81.

3. Mounting the jacket 22 onto the pallet 34.

4. Mounting the jacket 22 and the pallet 34 onto the centering plates 24 with a forklift.

5. Rotating the turntable 32 which includes the jacket 22, the pallet 34 and the centering plates 24 into alignment with the TV stand 53.

6. Lowering the packerhead assembly 39 within the interior of the jacket 22.

7. Aligning the trowel assembly 44 with the pallet 34 with the aid of the beveled edge 49 on the riser 48.

8. Start filling the form with concrete as the packerhead starts to spin. Preferably, a zero-slump concrete is utilized which will not tend to run or bulge out, and the concrete is packed in by the packerhead assembly as it starts to spin. The vibrator unit 36 also aids in packing the concrete. Thus, very little compaction time is required in forming the support ledge 13 before the packerhead assembly 39 starts to move upwardly.

9. Complete the filling operation as the rollerhead and trowel assemblies reach the top of the form.

10. Raise the packerhead assembly 39.

11. Rotate the turntable 32 away from the rollerhead and trowel assemblies, release the pin members 79 of the positioning lever 81 and remove the jacket 22 and pallet 34 from the centering plate with a forklift.

12. Release the jacket latches 23, slide the jacket 22 vertically, using the forklift, off of the pallet and continue sliding until the jacket 22 clears the top of the concrete for the meter pit.

13. Remove the slip ring 77 from the meter pit.

Basically, no further finishing steps are required before the meter pit is installed in the ground in a right-side-up position with the support ledge 13 at the upper end and with the notches 15 being at the lower end and straddling the water lines.

It is therefore to be understood that the above and other modifications may be made therein without departing from the spirit and scope of the apparatus as defined by the appended claims and reasonable equivalents thereof.

We claim:

1. A method of fabricating a meter pit, said meter pit comprising elongated precast wall sections of generally cylindrical configuration in end-to-end relation to one another, said pit being made from the steps comprising:

(a) securing a slip ring within a concentric jacket;

(b) positioning a pallet having said concentric jacket attached thereto on a turntable;

(c) lowering a packerhead assembly within said jacket, said packerhead assembly having a concentric rollerhead provided with a trowel, said trowel having a radially inwardly and downwardly inclined lower edge;

(d) injecting concrete into an annular space between said jacket and said rollerhead for downward flow until the space is entirely filled;

(e) raising said rollerhead and trowel as said annular space is being filled followed by removing said jacket; and (f) removing said slip ring from said wall sections.

2. A method of fabricating a meter pit according to claim 1 wherein said slip ring is of annular configuration with stepped upper and lower surfaces.

3. A method of fabricating a meter pit according to claim 1 wherein a radius of said slip ring is equivalent to a width of said wall sections.

4. A method of fabricating a meter pit according to claim 1 wherein said jacket includes circumferentially spaced bores and radially inwardly projecting upper and lower pin members that are aligned with said spaced bores.

5. A method of fabricating a meter pit according to claim 4 wherein said uppers and lower pin members are secured to circumferentially spaced levers.

6. A method of fabricating a meter pit according to claim 5 wherein said levers are moveable between dual positions.

7. A method of fabricating a meter pit according to claim 1 wherein said wall sections are defined by a first pipe section and a second pipe section.

8. A method of fabricating a meter pit according to claim 7 wherein a lap joint is formed between said first and second pipe sections.

9. A method of fabricating a meter pit, said meter pit comprising a hollow, elongated precast concrete pipe of generally cylindrical configuration having a plurality of wall sections, said pit being made from the steps comprising:

(a) positioning a pallet on a bottom plate and turntable, said pallet having an aligned outer concentric jacket, a slip ring, and an inner concentric rollerhead provided with a trowel having a radially inwardly and downwardly inclined lower edge which defines an inner beveled edge surface of at one end of said pipe;

(b) injecting concrete into an annular space between said jacket and said rollerhead for downward gravity flow until the space is entirely filled to define said pipe with an inner beveled surface at one end;

(c) raising said rollerhead and trowel as said annular space is being filled followed by removing said jacket; and (d) removing said slip ring.

10. A method of fabricating a meter pit according to claim 9 wherein said jacket includes positioning levers.

11. A method of fabricating a meter pit according to claim 10 wherein said jacket has aligned bores therein adapted to receive pin members secured to said positioning levers.

12. A method of fabricating a meter pit according to claim 10 wherein said slip ring is of annular configuration having ridged surfaces.

* * * * *